US012807215B2

(12) United States Patent
Lee

(10) Patent No.: US 12,807,215 B2
(45) Date of Patent: Nov. 24, 2026

(54) APPARATUS AND METHOD FOR CONTROLLING STEERING OF HOST VEHICLE

(71) Applicant: HL MANDO CORPORATION, Gyeonggi-do (KR)

(72) Inventor: Jung-Ae Lee, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 340 days.

(21) Appl. No.: 18/421,952

(22) Filed: Jan. 24, 2024

(65) Prior Publication Data

US 2024/0253696 A1 Aug. 1, 2024

(30) Foreign Application Priority Data

Jan. 30, 2023 (KR) ........................ 10-2023-0011674

(51) Int. Cl.
*B62D 5/04* (2006.01)

(52) U.S. Cl.
CPC ......... *B62D 5/0463* (2013.01); *B62D 5/0481* (2013.01)

(58) Field of Classification Search
CPC . B62D 55/0484; B62D 5/0481; B62D 5/0463
See application file for complete search history.

(56) References Cited

U.S. PATENT DOCUMENTS

2011/0010051 A1* 1/2011 Ura ...................... B62D 5/0487 701/41
2017/0012569 A1* 1/2017 Koseki .................... H02P 25/22
2019/0023315 A1* 1/2019 Takizawa ............. B62D 5/0484
2019/0176877 A1* 6/2019 Sugure ................. B62D 5/0463
2019/0193774 A1* 6/2019 Nakada .................. B62D 5/049
2019/0270478 A1* 9/2019 Kim ...................... B62D 15/025
2020/0062299 A1* 2/2020 Jeong ........................ B62D 3/12

(Continued)

FOREIGN PATENT DOCUMENTS

JP 2018-38176 3/2018
JP 2018-47875 3/2018

(Continued)

OTHER PUBLICATIONS

Notice of Allowance dated Feb. 22, 2025 for Korean Patent Application No. 10-2023-0011674 and its English translation by Google Translate.

*Primary Examiner* — Long T Tran
(74) *Attorney, Agent, or Firm* — WOMBLE BOND DICKINSON (US) LLP

(57) ABSTRACT

The present disclosure provides an apparatus for controlling the steering, including a first controller for controlling a torque sensor for detecting a steering torque, and a motor which calculates a motor torque based on the steering torque, and supplies at least a part of the motor torque; and a second controller for controlling the motor which receives a torque message corresponding to the remaining part of the motor torque from the first controller through a communication interface, and supplies the remaining part of the motor torque based on the torque message, wherein the second controller determines whether there is an abnormality in the torque message, and the first controller and the second controller exchange roles when there is an abnormality in the torque message.

13 Claims, 5 Drawing Sheets

(56) References Cited

U.S. PATENT DOCUMENTS

| | | | | |
|---|---|---|---|---|
| 2020/0353975 | A1* | 11/2020 | Nakamura | H02P 29/028 |
| 2022/0250675 | A1* | 8/2022 | Jeong | B62D 5/0484 |
| 2023/0192186 | A1* | 6/2023 | Kakas | B62D 5/046 701/41 |

FOREIGN PATENT DOCUMENTS

| | | |
|---|---|---|
| JP | 2018-50438 | 3/2018 |
| KR | 10-2021-0060185 | 5/2021 |
| KR | 10-2022-0102948 | 7/2022 |

* cited by examiner

APPARATUS AND METHOD FOR CONTROLLING STEERING OF HOST VEHICLE

CROSS-REFERENCE TO RELATED APPLICATION

This application claims priority to and the benefit of Korean Patent Application No. 10-2023-0011674, filed on Jan. 30, 2023, the disclosure of which is incorporated herein by reference in its entirety.

BACKGROUND

1. Field of the Invention

The present disclosure relates to an apparatus and method for controlling the steering of a host vehicle, and more specifically to an apparatus and method for controlling the steering of a host vehicle, which are capable of implementing a redundant safety mechanism.

2. Discussion of Related Art

The power steering of a vehicle is a steering apparatus based on power, and it serves to help a driver manipulate a steering wheel. Although the power steering method using hydraulic pressure has been mainly used, recently, the use of an electric power steering (EPS) system using the power of a motor has been increasing. The reason therefor is that the electric power steering system is lighter in weight, occupies less space and does not require oil change compared to the existing hydraulic power steering system.

Such an electric power steering system is configured by including a torque sensor that detects a steering torque generated by the rotation of a steering wheel and outputs an electrical signal that is proportional to the steering torque, an electronic control unit (ECU) that receives the electrical signal output from the torque sensor and outputs a motor driving signal, and a steering motor that generates an auxiliary torque based on the motor driving signal that is output from the ECU.

The steering motor generates an auxiliary torque and transmits the generated auxiliary torque to a rack, a pinion gear or a steering column to assist the steering torque of a driver.

Recently, the steer-by-wire (SbW) system that removes a mechanical connection apparatus such as a steering column, universal joint or pinion shaft between a steering wheel and a vehicle wheel, and controls the driving of a motor connected to a rack with an electrical signal such that the steering of a vehicle is achieved has been developed and applied. This SbW system may be configured by including a steering wheel for the driver's steering operation, a reaction motor which is installed on one side of the steering wheel to provide a reaction force torque according to the rotation of a steering wheel, an actuator which is connected to the rack to implement the steering operation, a sensor for detecting a steering angle, a vehicle speed and a steering wheel torque, and an ECU for driving an actuator and a reaction force motor according to an electrical signal that is input from the sensor.

Meanwhile, as higher stability of the vehicle is required, the technology has been introduced in which a slave ECU is further provided in an electric power steering system to perform steering control through the slave ECU when an abnormality occurs in the master ECU. Accordingly, there is an increasing demand for the method for more safely performing the steering of a vehicle by more accurately detecting the occurrence of an abnormality in the master ECU.

In addition, the master ECU transmits a torque message to the slave ECU such that the slave ECU controls the steering, and if there is an abnormality in the torque message, the slave ECU cannot control the steering, and thus, the master ECU alone controls the steering.

In this case, the master ECU controls steering such that 50% output is possible, and when the vehicle speed is above a certain speed, the output is relatively small, and there is no problem with steering. However, when the vehicle speed is below a certain speed or the vehicle is stopped, the output may be insufficient.

SUMMARY OF THE INVENTION

An object of the present disclosure is to provide a steering control apparatus which is capable of controlling a motor such that 100% output is possible by exchanging roles between a master controller and a slave controller when a torque message is abnormal.

The technical problems to be achieved in the present disclosure are not limited to the above-mentioned technical problem, and other technical problems that are not mentioned will be clearly understood by those skilled in the art from the description below.

In order to solve the above-described problems, the present disclosure provides an apparatus for controlling the steering, including a first controller for controlling a torque sensor for detecting a steering torque, and a motor which calculates a motor torque based on the steering torque, and supplies at least a part of the motor torque; and a second controller for controlling the motor which receives a torque message corresponding to the remaining part of the motor torque from the first controller through a communication interface, and supplies the remaining part of the motor torque based on the torque message, wherein the second controller determines whether there is an abnormality in the torque message, and the first controller and the second controller exchange roles when there is an abnormality in the torque message.

Herein, when there is an abnormality in the torque message, the second controller may calculate the motor torque based on the steering torque, control the motor to supply at least a part of the motor torque, and transmit the torque message corresponding to the remaining part of the motor torque to the first controller through the communication interface.

In addition, the first controller may control the motor to supply the remaining part of the motor torque based on the torque message received from the second controller.

In addition, the second controller may transmit an abnormal occurrence signal to the first controller when there is an abnormality in the torque message.

In addition, the second controller may stop a calculation operation of the motor torque when the abnormal occurrence signal is received from the first controller.

In addition, the first and second controllers may control the motor to supply ½ of the motor torque, respectively, regardless of whether the torque message received by the second controller is abnormal.

In addition, the first and second controllers may mutually monitor operating states through the communication interface.

In addition, the second controller may determine whether the operating state of the second controller is abnormal, and the first and second controllers may exchange roles when the operating state of the second controller is normal.

In addition, the second controller may stop the operation of the second controller when there is an abnormality in the operating state of the second controller.

In addition, when there is an abnormality in the operating state of the second controller, the first controller may control the motor by operating alone.

In addition, the second controller may receive operation state information of the first controller from the first controller through the communication interface.

In addition, the second controller may determine whether the first controller has an abnormality based on the operating state information of the first controller, and if there is an abnormality in the operation of the first controller, the roles of the first and second controllers may be exchanged with each other.

In addition, the present disclosure provides a method for controlling the steering of a host vehicle, which is a steering control method for controlling a motor by using a first controller and a second controller that are communicatively connected to a sensor for detecting a steering torque according to the rotation of a steering wheel, the method including the steps of controlling a motor such that the first controller calculates a motor torque based on the steering torque and supplies at least a part of the motor torque; transmitting, by the first controller, a torque message corresponding to the remaining part of the motor torque to the second controller through a communication interface; controlling, by the second controller, the motor to supply the remaining part of the motor torque based on the torque message; determining, by the second controller, whether the torque message is abnormal; and exchanging the roles of the first and second controllers when there is an abnormality in the torque message Herein, the step of exchanging the roles of the first and second controller may further include the steps of calculating, by the second controller, the motor torque based on the steering torque when there is an abnormality in the torque message; controlling, by the second controller, the motor to supply at least a part of the motor torque; and transmitting, by the second controller, the torque message corresponding to the remaining part of the motor torque to the first controller through the communication interface.

In addition, the step of exchanging the roles of the first and second controller may further include the step of controlling, by the first controller, the motor to supply the remaining part of the motor torque based on the torque message received from the second controller.

In addition, the step of exchanging the roles of the first and second controller may further include the step of transmitting, by the second controller, an abnormal occurrence signal to the first controller.

In addition, the step of exchanging the roles of the first and second controller may further include the step of stopping, by the second controller, a calculation operation of the motor torque when the abnormal occurrence signal is received from the first controller.

According to the present disclosure, it is possible to control the motor such that 100% output is possible by exchanging roles between a master controller and a slave controller when the torque message is abnormal. That is, the master controller and the slave controller can control the motor to supply ½ of the motor torque, respectively, regardless of whether the torque message is abnormal.

In addition, according to the present disclosure, the operating state is monitored between the master controller and the slave controller, and if there is an abnormality in the operating state of any one controller, the operation of the controller with the abnormality is stopped, and the normal controller operates alone to control the motor such that it is possible to implement a redundant safety mechanism.

The effects of the present disclosure are not limited to those mentioned above, and other effects that are not mentioned will be clearly understood by those skilled in the art from the description below.

DETAILED DESCRIPTION OF THE EMBODIMENTS

Figure 1:
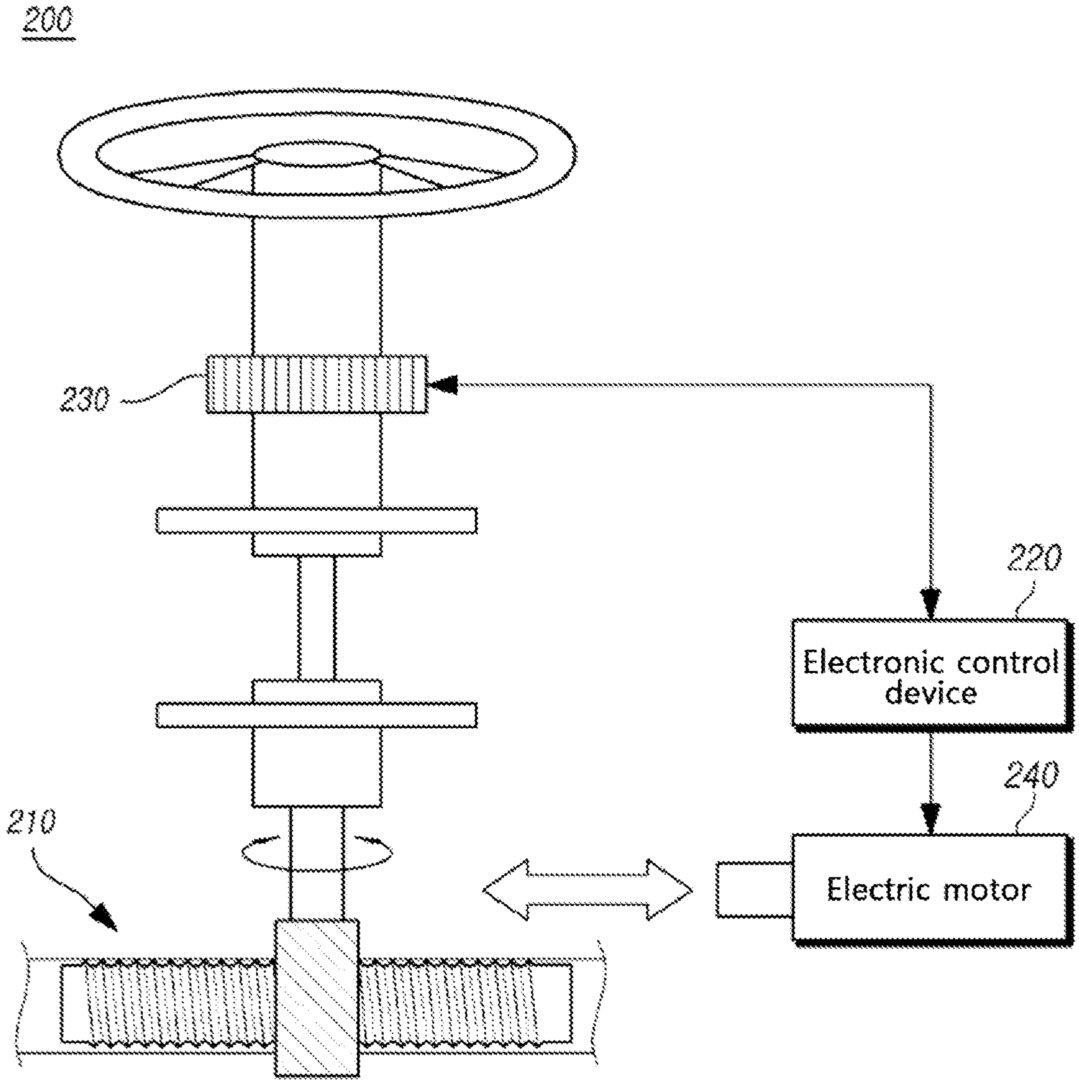
FIG. 1 is a diagram schematically showing a mechanical steering assistance system according to an exemplary embodiment of the present disclosure.

Hereinafter, with reference to the accompanying drawings, the exemplary embodiments of the present disclosure will be described in detail so that those skilled in the art can easily practice the present disclosure. The present disclosure may be embodied in many different forms and is not limited to the exemplary embodiments set forth herein. In order to clearly describe the present disclosure in the drawings, parts that are irrelevant to the description are omitted, and the same reference numerals are assigned to the same or similar components throughout the specification.

In the present specification, terms such as “include” or “have” are intended to designate that there exists a feature, number, step, operation, component, part or combination thereof described in the specification, but it should be understood that it does not preclude the possibility of the presence or addition of one or more other features, numbers, steps, operations, components, parts or combinations thereof.

Figure 2:
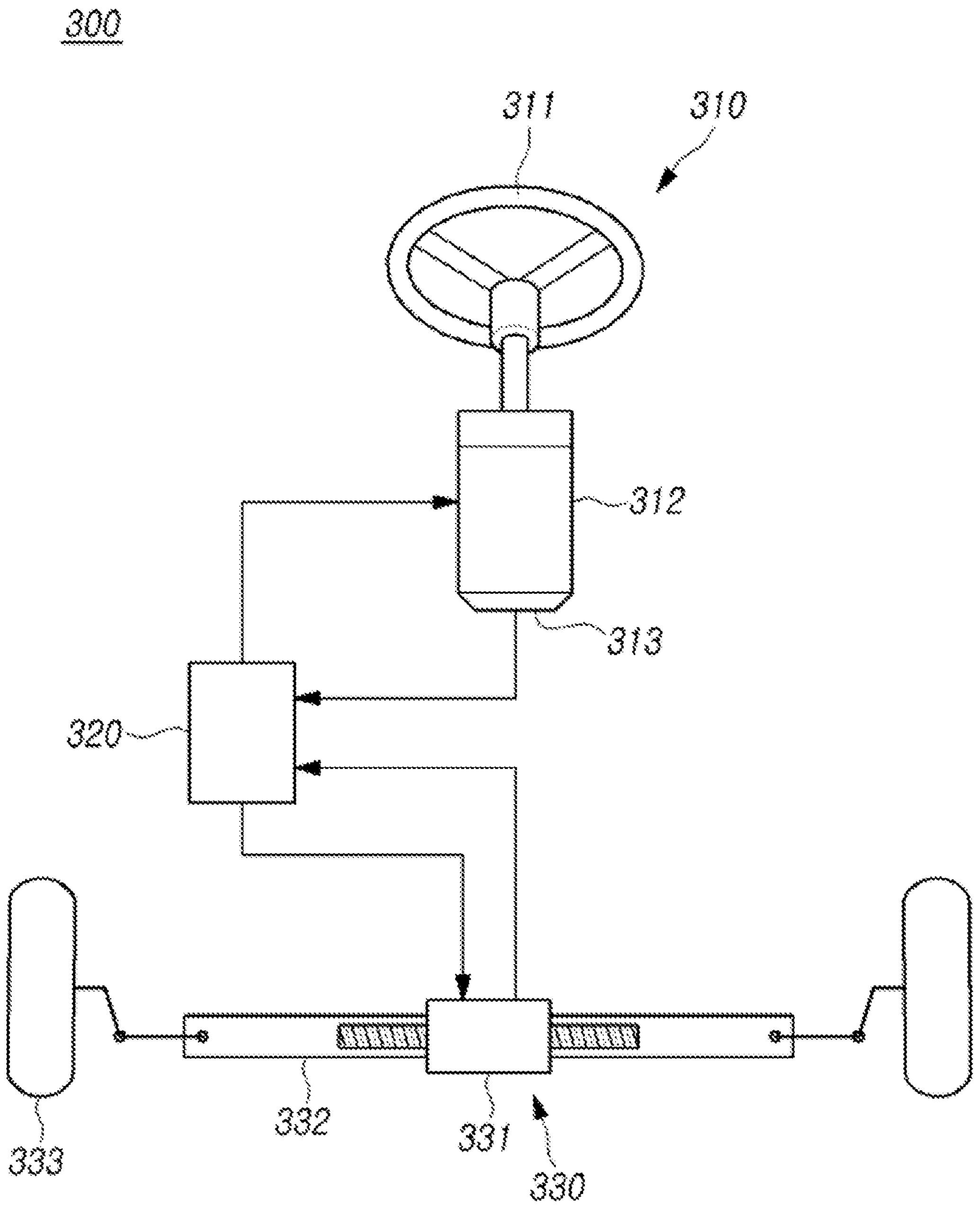
FIG. 2 is a diagram schematically showing a steer-by-wire system according to an exemplary embodiment of the present disclosure.

FIG. 1 is a diagram schematically showing a mechanical steering assistance system according to an exemplary embodiment of the present disclosure, and FIG. 2 is a diagram schematically showing a steer-by-wire system according to an exemplary embodiment of the present disclosure.

The steering assistance system to which an exemplary embodiment of the present disclosure can be applied refers to a system that assists a steering force such that a driver can easily steer in a manual driving mode and performs the steering of a vehicle without the driver’s manipulation in the case of an autonomous driving mode. The steering assistance system may be classified into a mechanical steering assistance system and a steer-by-wire system depending on whether a steering wheel is coupled to a wheel by a mechanical connecting member.

Referring to FIG. 1, the configuration of a mechanical steering assistance system to which an exemplary embodiment of the present disclosure can be applied is briefly illustrated. The mechanical steering assistance system 200 may include a rack and pinion gear 210, a torque sensor 230, an electronic control device 220 and an electric motor 240.

The rack and pinion gear 210 includes a pinion gear, a rack gear and a meshing part in which the pinion gear and the rack gear are engaged, and the rack gear linearly moves according to the rotational motion of the pinion gear. Herein, moving the meshing part from one end to the other end of the rack gear is referred to as a rack stroke.

The torque sensor 230 is disposed on the input shaft of the steering shaft, detects a steering torque according to the driver's rotational manipulation of the steering wheel, and generates and transmits the detected steering torque information to the electronic control device 220.

The electronic control device 220 receives information necessary for steering control from a plurality of sensors including the torque sensor 230, and generates a motor control current by considering the received information to control the driving direction and driving force of the electric motor 240.

Referring to FIG. 2, the configuration of a steer-by-wire system to which an exemplary embodiment of the present disclosure can be applied is briefly illustrated.

The steer-by-wire system 300 may be configured by including a steering input actuator 310, an electronic control unit 320 and a steering output actuator 330. As described above, in the steer-by-wire system 300, the steering input actuator 310 and the steering output actuator 330 are mechanically separated.

The steering input actuator 310 may refer to a device for inputting steering information intended by a driver to the electronic control device 320. As described above, the steering input actuator 310 may include a steering wheel 311, a steering shaft 312 and a reaction force motor 313, and may further include a steering angle sensor or a torque sensor.

The reaction force motor 313 may receive a control signal from the electronic control device 320 and apply reaction force to the steering wheel 311. Specifically, the reaction force motor 313 may generate a reaction force torque by receiving a command current from the electronic control device 320 and driving the same at a rotational speed indicated by the command current.

The electronic control device 320 may receive steering information from the steering input actuator 310, calculate a control value and output an electrical signal indicating the control value to the steering output actuator 330. Herein, the steering information may include a steering angle and a steering torque.

Meanwhile, the electronic control device 320 calculates a control value by receiving power information that is actually output from the steering output actuator 330 as feedback, and outputs an electrical signal instructing the control value to the steering input actuator 310 to provide steering feeling (control feeling) to the driver.

The steering output actuator 330 may include a steering motor 331, a rack 332 and a wheel 333, and may further include a vehicle speed sensor and a rack position sensor.

The steering motor 331 may move the rack 332 in an axial direction. Specifically, the steering motor 331 may receive a command current from the electronic control device 320 to drive, and linearly move the rack 332 in the axial direction.

The rack 332 may perform linear motion by the driving of the steering motor 331, and the wheel 333 is steered left or right through the linear motion of the rack 332.

The steering assistance system may further include a clutch that is capable of separating or coupling the steering input actuator 310 and the steering output actuator 330. Herein, the clutch may operate under the control of the electronic control device 320.

Figure 3:
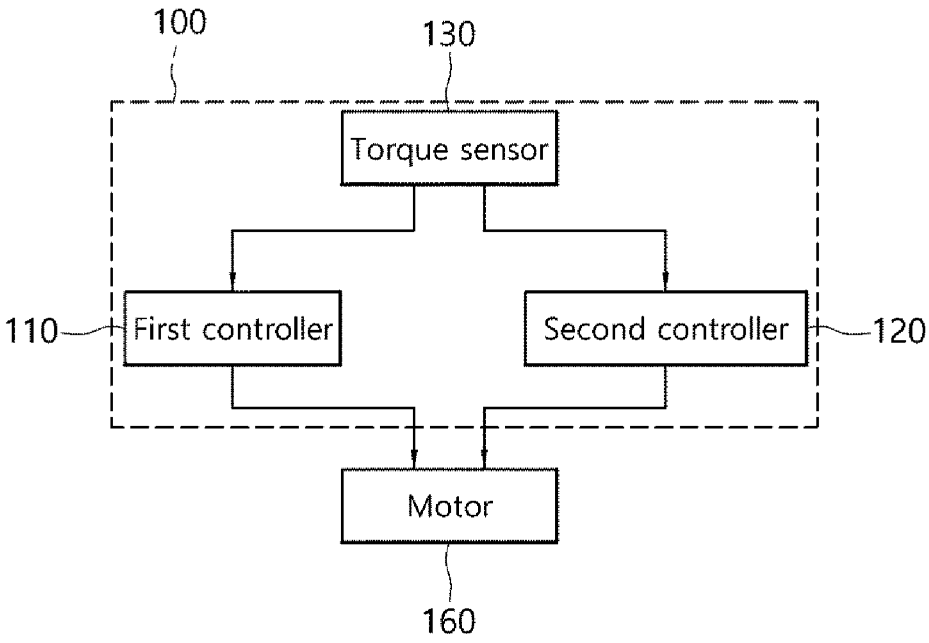
FIG. 3 is a block diagram of a steering control apparatus according to an exemplary embodiment of the present disclosure.

FIG. 3 is a block diagram of a steering control apparatus according to an exemplary embodiment of the present disclosure.

Referring to FIG. 3, the steering control apparatus 100 according to an exemplary embodiment of the present disclosure is an apparatus for controlling the aforementioned steering assistance system, and it may be configured by including a torque sensor 130, a first controller 110 and a second controller 120.

Herein, the first controller 110 and the second controller 120 may be provided in the aforementioned electronic control devices 230, 320.

In addition, the steering control apparatus 100 according to an exemplary embodiment of the present disclosure may further include various sensors for detecting vehicle-related information including a vehicle speed sensor and a steering angle sensor.

The torque sensor 130 may detect a steering torque corresponding to a steering force applied by a driver through a steering wheel. The torque sensor 130 may input information about the detected steering torque to the first controller 110.

The first controller 110 may be implemented by an input/output interface circuit for exchanging information with an external device provided in the vehicle, such as a torque sensor, a microcontroller (MCU) for controlling the motor while feedback-controlling the motor current based on the input information, and an electronic control unit (ECU) including a motor detection circuit for detecting a motor current supplied to the motor. Herein, the first controller 110 may operate as a master ECU.

The first controller 110 may control the overall operation of the steering assistance system provided in the vehicle. For example, the steering assistance system may include EPS, SbW or the like, and as long as it is a system that is capable of steering control under the control of the first controller 110, it is not limited to the name or type thereof.

The first controller 110 may receive information about a steering torque detected by the torque sensor 130. The first controller 110 may control the motor 160 to supply a motor torque related to steering based on input steering torque information, vehicle speed information of the vehicle and motor current information supplied to the motor. For example, the motor torque related to steering may correspond to an auxiliary torque or a reaction force torque based on the driver's steering torque.

The second controller 120 may be implemented by an input/output interface circuit for exchanging information with an external device provided in the vehicle, such as the torque sensor 130, a microcontroller (MCU) for controlling the motor while feedback-controlling a motor current based on input information, and an ECU including a motor detection circuit for detecting a motor current supplied to the motor. Herein, the second controller 120 may operate as a slave ECU.

Meanwhile, although the drawings show that the first controller 110 and the second controller receive a steering torque through one torque sensor 130, two torque sensors may be provided, and each torque sensor may input a steering torque to the first controller 110 and the second controller, respectively. Accordingly, when an abnormality occurs in any one of the two torque sensors, steering may be maintained by using the other torque sensors.

When an abnormality occurs in the second controller 120 and the steering assistance system does not operate normally, the first controller 110 may control the steering assistance system alone. In addition, when an abnormality occurs in the first controller 110 and the steering assistance system does not operate normally, the second controller 120 may control the steering assistance system alone. To this end, the first controller 110 and the second controller 120 may monitor mutual operation states through a communication interface 150 provided between the controllers 110, 120.

As described above, the steering control apparatus 100 according to an exemplary embodiment of the present disclosure may implement a redundant safety mechanism by controlling the steering assistance system with the remaining controller that is normal when an abnormal occurrence is recognized in any one of the first and second controllers 110, 120.

The communication interface 150 is built between the first controller 110 and the second controller 120 and can be used for mutual signal transmission and reception. For example, the communication interface 150 may be implemented as a CAN interface. However, this is just an example and the present disclosure is not limited thereto, and as long as it is an independent communication interface that can be used to transmit and receive signals between the first controller 110 and the second controller 120, it is not limited to the type or name thereof.

According to one example, the first controller 110 and the second controller 120 may be set to transmit and receive signals representing information about each other's operating states through the communication interface 150 at predetermined cycles. According to another example, the first controller 110 and the second controller 120 may be set to monitor normal operation based on whether signals that are output from a specific terminal of the other party are detected. In addition, as long as the operating state of these controllers 110, 120 can be monitored, the monitoring method is not limited to a specific method.

When a signal indicating operating state information is not received from the second controller 120 or an abnormal occurrence signal is received, the first controller 110 may recognize that an abnormality related to the operating state of the second controller 120 has occurred.

When a signal indicating operating state information is not received from the first controller 110 or an abnormal occurrence signal is received, the second controller 120 may recognize that an abnormality related to the operating state of the first controller 110 has occurred.

The first controller 110 may calculate a motor torque based on the steering torque received from the torque sensor 130 and control the motor 160 to supply at least a part of the motor torque.

The second controller 120 may control the motor 160 such that it receives a torque message corresponding to the remaining part of the motor torque from the first controller 110 through the communication interface 150, and supplies the remaining part of the motor torque based on the torque message.

For example, the first and second controllers 110, 120 may control the motor 160 to supply ½ of the motor torque, respectively.

The second controller 120 may determine whether the torque message received from the first controller 110 is abnormal. In this case, the second controller 120 may exchange the roles of the first controller 110 and the second controller 120 when there is an abnormality in the torque message.

Specifically, when there is an abnormality in the torque message, the second controller 120 may transmit an abnormal occurrence signal to the first controller 110 through the communication interface 150.

The first controller 110 may stop the calculation operation of the motor torque when the abnormal occurrence signal is received.

When there is an abnormality in the torque message, the second controller 120 may receive a steering torque from the torque sensor 130 and calculate a motor torque instead of the first controller 110 based on the received steering torque.

Then, the second controller 120 may control the motor 160 to supply at least a part of the motor torque, and transmit a torque message corresponding to the remaining part of the motor torque to the first controller 110 through the communication interface 150.

The first controller 110 may control the motor 160 to supply the remaining part of the motor torque based on the torque message received from the second controller 120.

Accordingly, the first and second controllers 110, 120 may control the motor to supply ½ of the motor torque, respectively, regardless of whether the torque message received by the second controller 120 from the first controller 110 is abnormal. That is, the first and second controllers 110, 120 may control the motor such that 100% output is possible regardless of whether there is an abnormality in the torque message.

The second controller 120 determines whether the operating state of the second controller 120 is abnormal, and if the operating state of the second controller 120 is normal, the roles of the first and second controllers 110, 120 may be exchanged with each other.

In this case, the second controller 120 stops the operation of the second controller 120 when there is an abnormality in the operating state of the second controller 120, and the first controller 110 operates alone to control the motor 160, thereby implementing a redundant safety mechanism. However, the first controller 110 may control the motor 160 to enable 50% output.

Figure 4:
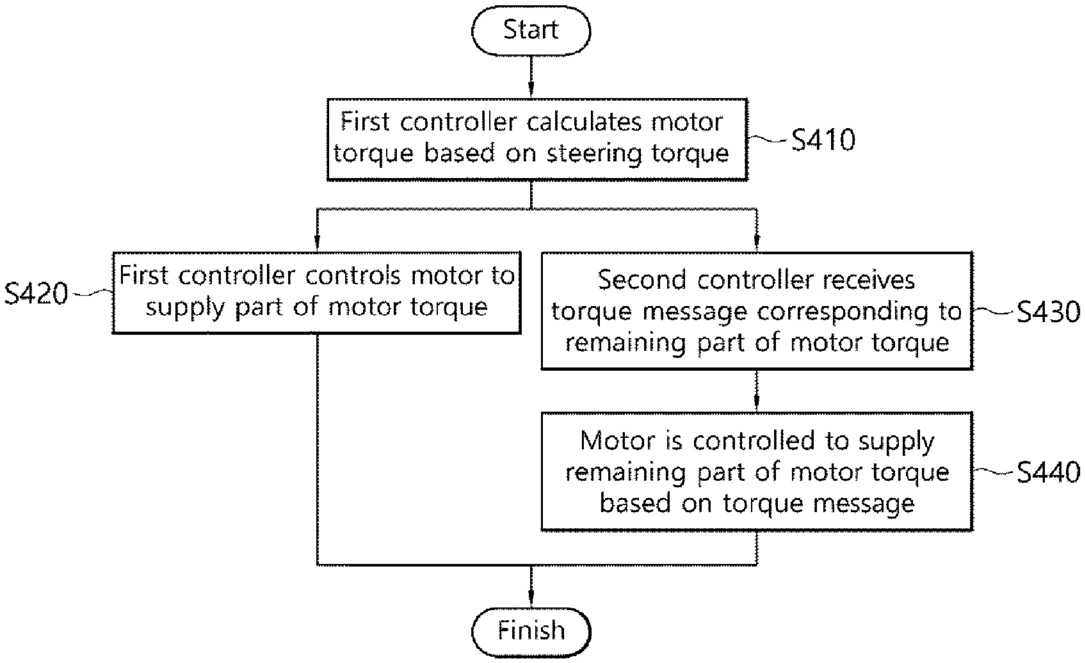
FIG. 4 is a flowchart of the normal operation of a steering control method according to an exemplary embodiment of the present disclosure during normal operation.
Figure 5:
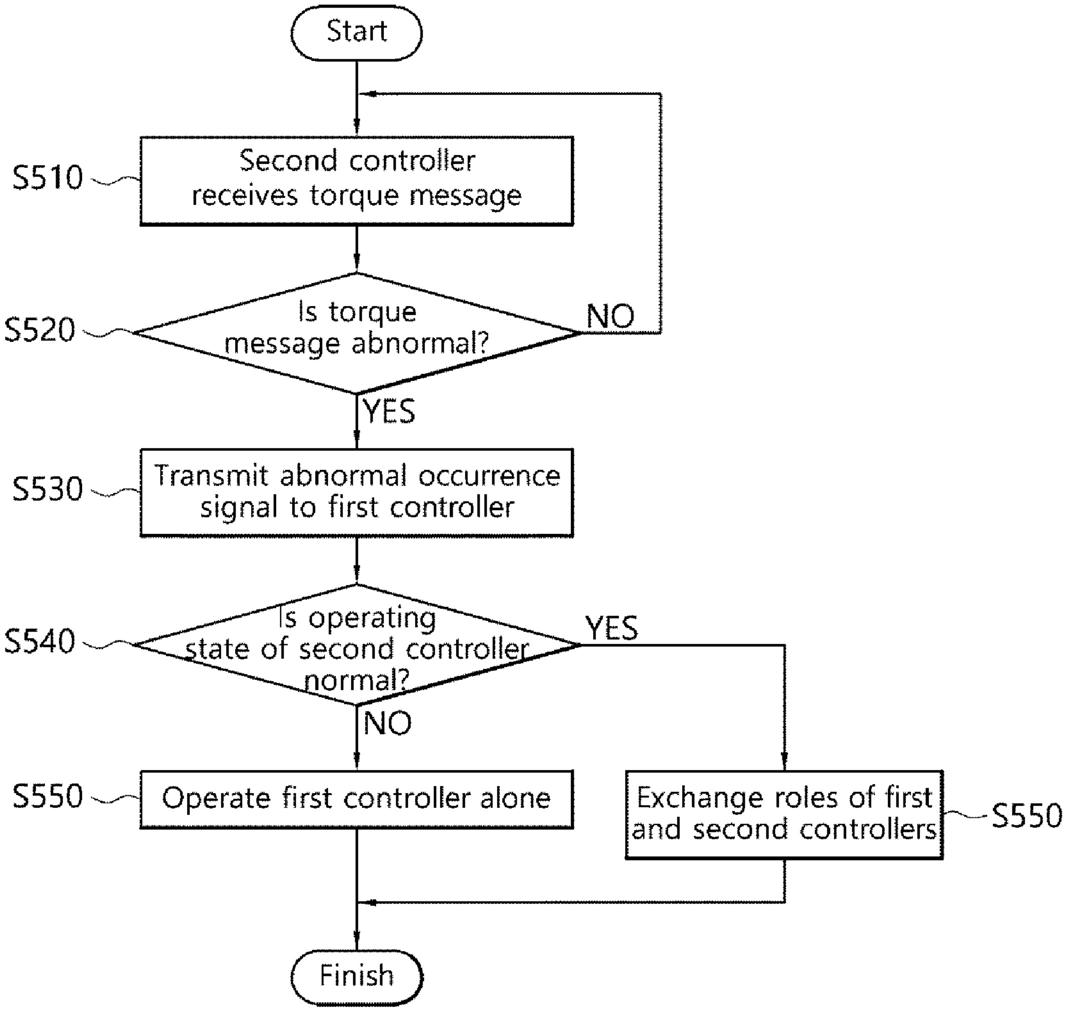
FIG. 5 is a flowchart of the steering control method according to an exemplary embodiment of the present disclosure when a torque message is abnormal.
Figure 6:
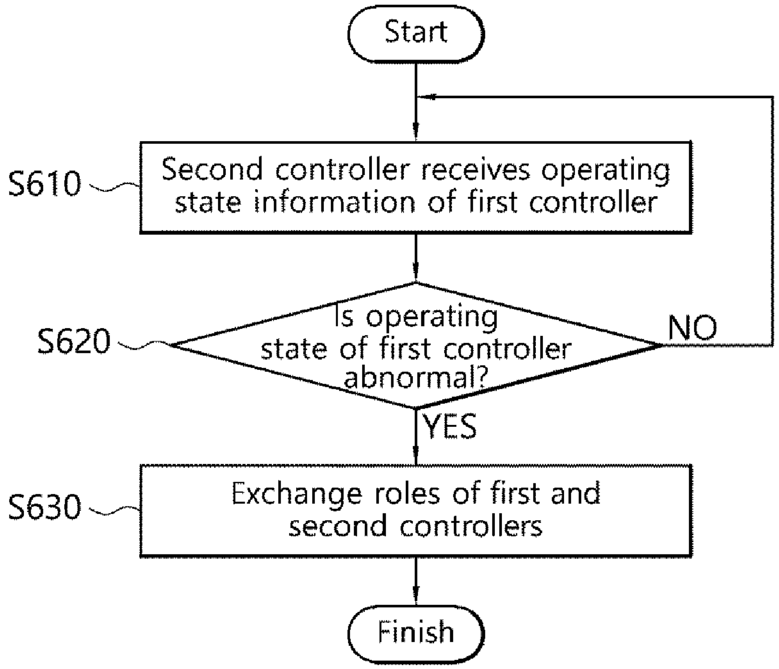
FIG. 6 is a flowchart of the steering control method according to an exemplary embodiment of the present disclosure when the operating state of a first controller is abnormal.

FIG. 4 is a flowchart of the normal operation of a steering control method according to an exemplary embodiment of the present disclosure during normal operation, FIG. 5 is a flowchart of the steering control method according to an exemplary embodiment of the present disclosure when a torque message is abnormal, and FIG. 6 is a flowchart of the steering control method according to an exemplary embodiment of the present disclosure when the operating state of a first controller is abnormal.

Referring to FIG. 4, first of all, the first controller 110 may calculate a motor torque based on the steering torque received from the torque sensor 130 (S410), and control the motor 160 to supply at least a part of the motor torque (S420).

Next, the second controller 120 may receive a torque message corresponding to the remaining part of the motor torque from the first controller 110 through the communication interface 150 (S430), and control the motor 160 to supply the remaining part of the motor torque based on the torque message (S440).

For example, the first and second controllers 110, 120 may control the motor 160 to supply ½ of the motor torque, respectively.

In this case, if there is an abnormality in the torque message, since the second controller 120 cannot control the motor 160, the first controller 110 alone controls the motor 160. In this case, the first controller 110 controls the motor 160 such that 50% output is possible, and when the vehicle speed is above a certain speed, the output is relatively small, and there is no problem with steering. However, when the vehicle speed is below a certain speed or the vehicle is stopped, the output may be insufficient.

In order to solve this problem, the present disclosure controls the motor 160 such that 100% output is possible by exchanging the roles of the first controller 110 and the second controller 120 when the torque message is abnormal. That is, the first and second controllers 110, 120 control the motor 160 to supply ½ of the motor torque, respectively, regardless of whether the torque message is abnormal.

Specifically, referring to FIG. 5, the second controller 120 receives a torque message from the first controller 110 (S510), and determines whether the received torque message is abnormal (S520). In this case, if there is an abnormality in the torque message, the roles of the first controller 110 and the second controller 120 are exchanged with each other.

Specifically, first of all, when there is an abnormality in the torque message, the second controller 120 transmits an abnormal occurrence signal to the first controller 110 through the communication interface 150 (S530).

In this case, the first controller 110 stops the calculation operation of the motor torque when the abnormal occurrence signal is received, and the second controller 120 receives a steering torque from the torque sensor 130 and calculates a motor torque instead of the first controller 110 based on the received steering torque.

Next, the second controller 120 controls the motor 160 to supply at least a part of the motor torque, and transmits a torque message corresponding to the remaining part of the motor torque to the first controller 110 through the communication interface 150.

Next, the first controller 110 controls the motor 160 to supply the remaining part of the motor torque based on the torque message received from the second controller 120.

Accordingly, the first and second controllers 110, 120 may control the motor to supply ½ of the motor torque, respectively, regardless of whether the torque message received by the second controller 120 from the first controller 110 is abnormal. That is, the motor can be controlled such that 100% output is possible regardless of whether the torque message is abnormal.

The second controller 120 determines whether the operating state of the second controller 120 is abnormal, and if the operating state of the second controller 120 is normal, the roles of the first and second controllers 110, 120 are exchanged with each other In this case, the second controller 120 determines whether the operating state of the second controller 120 is normal (S540), and if there is an abnormality in the operating state of the second controller 120, the operation of the second controller 120 is stopped, and the first controller 110 alone operates to control the motor 160 (S560), thereby implementing a redundant safety mechanism. However, the first controller 110 controls the motor 160 to enable 50% output.

Referring to FIG. 6, the second controller 120 receives operating state information of the first controller 110 from the first controller 110 (S610), and determines whether the operating state of the first controller 110 is abnormal (S620). In this case, if there is an abnormality in the operating state of the first controller 110, the roles of the first controller 110 and the second controller 120 are exchanged with each other (S630).

Herein, the method for exchanging roles between the first controller 110 and the second controller 120 is the same as the method in case of an abnormal torque message.

Although an exemplary embodiment of the present disclosure has been described above, the spirit of the present disclosure is not limited to the exemplary embodiments presented herein, and those skilled in the art who understand the spirit of the present disclosure may easily suggest other exemplary embodiments by modifying, changing, deleting or adding components within the scope of the same spirit, but this will also fall within the scope of the present disclosure.

What is claimed is:

1. An apparatus for controlling the steering of a host vehicle, comprising:

a first controller configured to perform a first role; and a second controller configured to perform a second role, wherein the first role comprises:

receiving a steering torque from a torque sensor;

calculating a motor torque based on the steering torque;

dividing the motor torque into a first motor torque and a second motor torque; and controlling a steering motor corresponding to the first motor torque and provide the second motor torque to another controller as a torque message, wherein the second role comprises:

receiving the torque message;

controlling the steering motor corresponding to the second motor torque based on the torque message, wherein the second controller is further configured to determine an abnormality in the torque message; and wherein, in response to the determination of the abnormality, the first controller and the second controller are switched to exchange the first role and the second role with each other.

2. The apparatus of claim 1, wherein, in response to the determination of the abnormality, the second controller transmits an abnormal occurrence signal to the first controller.

3. The apparatus of claim 2, wherein, upon receiving the abnormal occurrence signal, the first controller stops a calculation operation of the motor torque.

4. The apparatus of claim 1, wherein the first motor torque and the second motor torque are each equal to ½ of the motor torque.

5. The apparatus of claim 1, wherein the first and second controllers mutually monitor operating states through the communication interface.

6. The apparatus of claim 1, wherein the second controller is further configured to determine that the operating state of the second controller is normal, wherein the first role and the second role are exchanged on condition that the second controller is operating normally.

7. The apparatus of claim 6, wherein the second controller is further configured to determine that the operating state of the second controller is abnormal, and stops the operation of the second controller.

8. The apparatus of claim 7, wherein the first controller controls the steering motor by operating alone.

9. The apparatus of claim 1, wherein the second controller receives operation state information of the first controller from the first controller through the communication interface.

10. The apparatus of claim 9, wherein the second controller determines whether the first controller has an abnormality based on the operating state information of the first controller, and if there is an abnormality in the operation of the first controller, the first role and the second role are exchanged with each other.

11. A method for controlling the steering of a host vehicle, which is a steering control method for controlling a motor by using a first controller and a second controller that are communicatively connected to a sensor for detecting a steering torque according to the rotation of a steering wheel, the method comprising the steps of:

performing a first role, by the first controller, wherein the first role comprises:
- receiving a steering torque from a torque sensor;
- calculating a motor torque based on the steering torque;
- dividing the motor torque into a first motor torque and a second motor torque; and
- controlling a steering motor corresponding to the first motor torque and provide the second motor torque to another controller as a torque message;

performing a second role, by the second controller, wherein the second role comprises:
- receiving the torque message;
- controlling the steering motor corresponding to the second motor torque based on the torque message;
- determining, by the second controller, an abnormality in the torque message; and
- in response to the determination of the abnormality, switching, by the first controller and the second controller, to exchange the first role and the second role with each other.

12. The method of claim 11, further comprising transmitting, by the second controller, an abnormal occurrence signal to the first controller.

13. The method of claim 12, further comprising:
stopping, by the first controller, a calculation operation of the motor torque when the abnormal occurrence signal is received from the second controller.

* * * * *